United States Patent [19]

Moinard et al.

[11] Patent Number: 5,205,621
[45] Date of Patent: Apr. 27, 1993

[54] BRAKE-PRESSURE REDUCTION MEANS FOR A MOTOR VEHICLE

[75] Inventors: Patrice Moinard, Montreuil; Philippe Castel, Paris; Roland Levrai, Stains, all of France

[73] Assignee: Bendix Europe Services Techniques, Drancy, France

[21] Appl. No.: 794,185

[22] Filed: Nov. 19, 1991

[30] Foreign Application Priority Data

Dec. 13, 1990 [FR] France .................. 90 15609

[51] Int. Cl.$^5$ .............................................. B60T 8/32
[52] U.S. Cl. ................................ 303/113.5; 303/119.2
[58] Field of Search ........ 303/113 AP, 113 R, 119 R, 303/119 SV, DIG. 4, 9.63, 9.71, 84.2

[56] References Cited

U.S. PATENT DOCUMENTS 4,840,434 6/1989 Leiber ........................... 303/119 SV

FOREIGN PATENT DOCUMENTS

| 02092786 | 6/1986 | European Pat. Off. |
| 3742364 | 6/1989 | Fed. Rep. of Germany |
| 60-85051 | 5/1985 | Japan |
| 2213543 | 8/1989 | United Kingdom ......... 303/113 AP |

Primary Examiner—Douglas C. Butler
Assistant Examiner—Josie A. Ballato
Attorney, Agent, or Firm—Larry J. Palguta; Ken C. Decker

[57] ABSTRACT

A pressure reduction mechanism (10) is installed in a brake circuit of the rear axle of a motor vehicle, comprising a master cylinder (1) and at least one monitoring device, the mechanism executing the brake-pressure reduction only in specific circumstances and comprising a regulating piston (14) sliding sealingly in a bore (13) and stressed by at least one spring (16, 17) in the opening direction of a regulating valve (15). The spring (16, 17) is arranged in a sealed chamber filled with an incompressible fluid, and a solenoid valve (22) controls the opening or closing of communication between the chamber and a reservoir of the fluid under low pressure.

3 Claims, 2 Drawing Sheets

BRAKE-PRESSURE REDUCTION MEANS FOR A MOTOR VEHICLE

BACKGROUND OF THE INVENTION

The present invention relates to a pressure reduction means installed in the brake circuit of the rear axle of a motor vehicle, comprising a master cylinder and at least one monitoring device, and this means executing the brake-pressure reduction only in specific circumstances.

A brake system employing such a pressure reduction means is disclosed particularly in German Patent Application DE-A-3,742,173.

According to this document, a branch line which can be opened or closed by means of a solenoid valve short-circuits the brake-pressure reduction means. This braking system has a serious disadvantage in that, in the event of a failure of the anti-lock function, the valve shutter of the solenoid valve, which must then rest on its seat so as to close this branch line, is subject to a high difference of pressures exerted on its opposite faces. This results in the need to use a spring for returning this shutter to rest, having a high prestress which the force generated by the solenoid of the solenoid valve has to overcome during normal operation. Thus, the solenoid valve is of a costly type since it has to be oversized to ensure that the braking system described is reliable.

SUMMARY OF THE INVENTION

An object of the present invention is to overcome this disadvantage by employing a solenoid valve which is not oversized in a braking system of markedly higher reliability.

It is known that a conventional pressure reduction means comprises a regulating piston sliding sealingly in a bore and stressed by at least one spring in the opening direction of a regulating valve.

According to the invention, this spring is arranged in a sealed chamber filled with an incompressible fluid, and a solenoid valve controls communication between this chamber and a reservoir of this fluid under low pressure.

Where the vehicle is equipped with an anti-lock device, during the normal operation of the anti-lock function this communication is closed, whereas in the event of incorrect operation it is opened.

Preferably, this same communication is closed in the event of a failure of one of the two brake circuits normally equipping a motor vehicle.

BRIEF DESCRIPTION OF THE DRAWINGS

The invention will now be described by way of example with reference to the accompanying drawings in which.

DETAILED DESCRIPTION OF THE INVENTION

Figure 1:
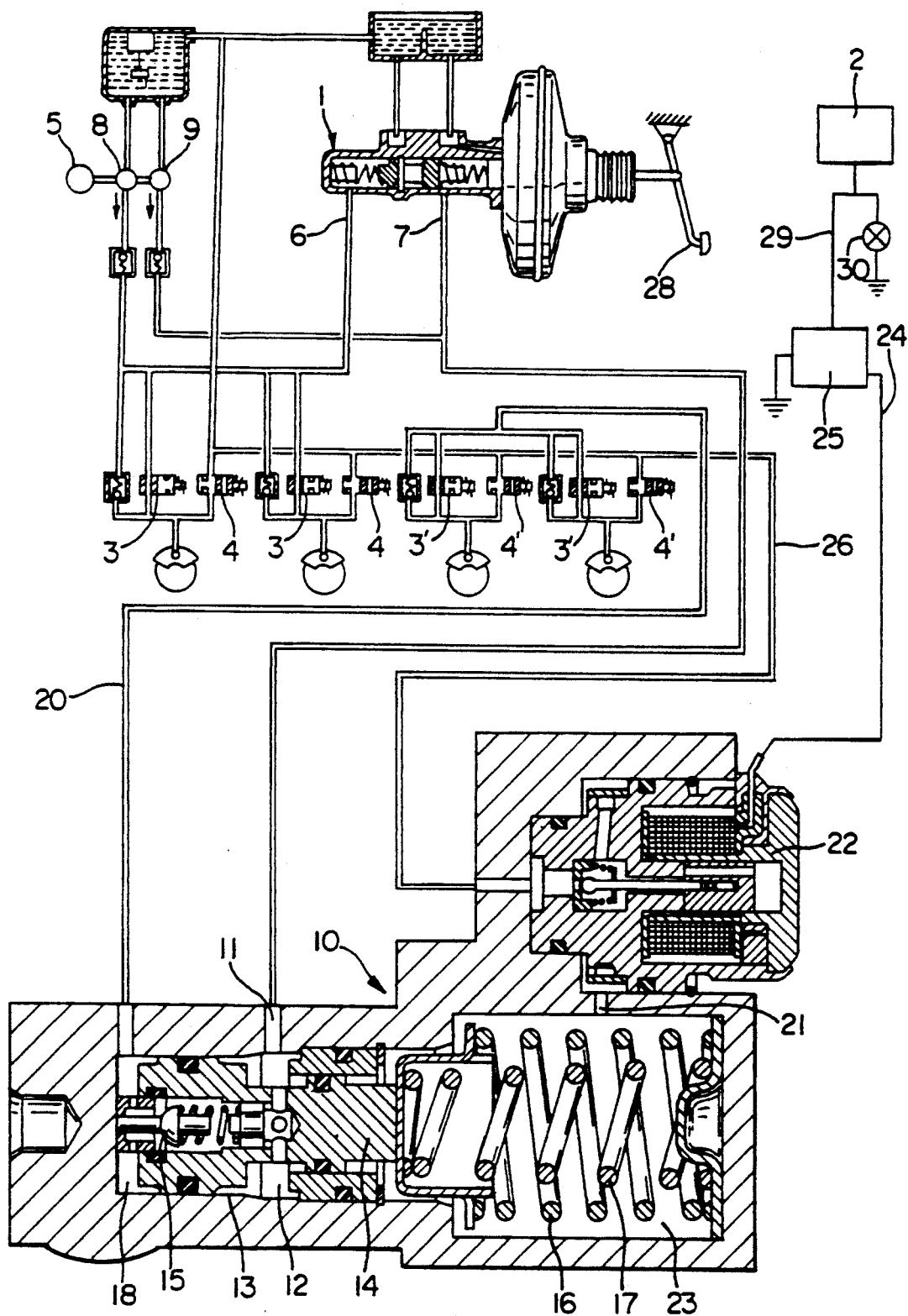
FIG. 1 shows diagrammatically a brake system including a pressure reduction means according to the invention.

FIG. 1 shows diagrammatically the hydraulic part of an anti-lock braking system. For the sake of clarity, the electrical part of the braking system is illustrated only insofar as it is important for the present embodiment of the invention. Thus, the sensors for determining the rotational speed of the wheels, the connection of these sensors to the anti-lock control device 2, in which the monitoring device is also integrated, the electrical connection between the pressure-modulating solenoid valves 3, 4, 3', 4' and the engine 5 and the anti-lock control device 2 are not shown. Various switches and sensors for monitoring the operation of the system are not shown either.

The braking system comprises a tandem master cylinder 1, from which a front-axle brake circuit 6 and a rear-axle brake circuit 7 lead to the associated wheel brakes via solenoid valves 3 and 3' serving as inlets. To cause the pressure to drop during an anti-lock control in which the engine 5 drives the two pumps 8 and 9, the wheel brakes can each be connected via a solenoid valve 4, 4' serving as an outlet to a return line leading to a low-pressure reservoir.

On the rear-axle brake circuit 7 there is a brakepressure reduction device 10 of a known type, the inlet 11 of which is connected to the inlet chamber 12. This pressure reduction device is composed essentially of a regulating piston 14 which is axially guided slidably and sealingly in the bore 13 and of the regulating valve 15 installed in this piston, the regulating piston 14 being stressed by the control springs 16, 17 in the opening direction of the elastically stressed regulating valve 15. A duct in which this regulating valve is installed puts the inlet and outlet chambers 12 and 18 in communication at rest. A channel 20 extends from the outlet chamber 18 of the device via the solenoid valves 3' towards the rear-wheel brakes.

The control springs 16, 17 are arranged in a sealed chamber 23 formed in the bore 13 of the brake-pressure reduction device 10.

This sealed chamber 23 communicates with a reservoir of brake fluid under low pressure by way of a port 21, a solenoid valve 22, and a conduit 26.

The solenoid valve 22 is designed in the form of a solenoid valve open in the de-energized state and actuated by the relay 25 to which it is connected by means of the line 24. The relay 25 closes the solenoid valve 22 when no failure of the anti-lock function is detected, the line 29 connecting the relay 25 to the monitoring device provided in the anti-lock control device 2. If the monitoring device detects incorrect operation, a control voltage is generated, and this on the one hand lights the visual indicator 30 and on the other hand isolates the line 24 from the voltage source.

Thus, during normal operation, the solenoid valve 22 is energized and cuts off communication between the chamber 23 and the conduit 26 leading to the reservoir. This results in the substantial presence of a hydraulic wall in the chamber 23. The brake-pressure reduction device 10 then has no role to play, since the regulating piston 14 cannot be displaced counter to this hydraulic wall. In contrast, in the event of incorrect operation of the anti-lock function or of an electrical failure, the solenoid valve 22 opens this same communication, thus eliminating any hydraulic wall in the chamber 23. The regulating piston 14 is thus free to be displaced under the effect of the inlet pressure of the brake fluid in a way known per se.

Such a system is especially reliable, especially because the shutter of the solenoid valve 22 is not subjected to a pressure differential tending to have an adverse effect, and because the pressure-regulating device 10 is always connected in series with the rearwheel brakes.

Figure 2:
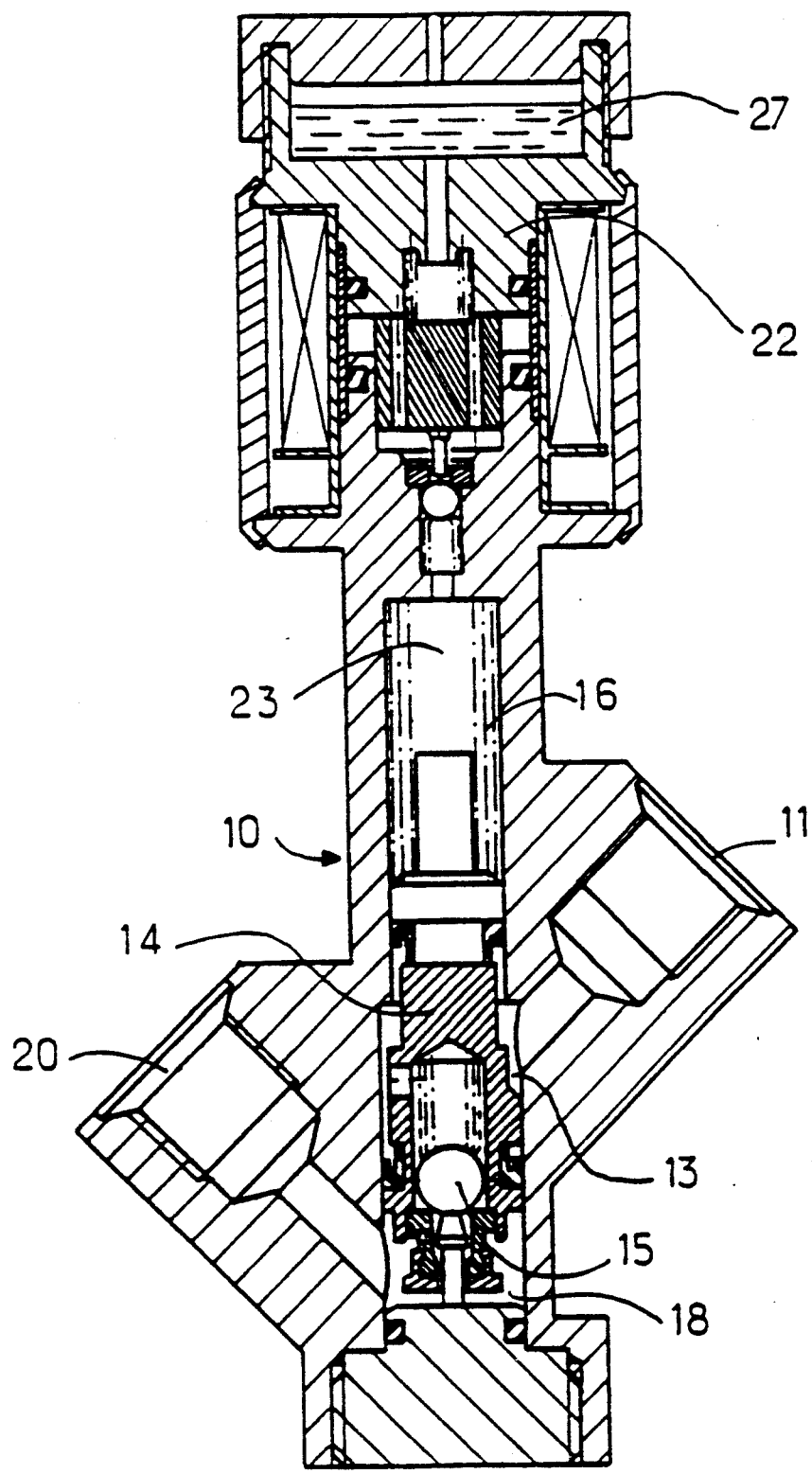
FIG. 2 illustrates diagrammatically another embodiment of the pressure reduction means according to the invention.

In the embodiment partially illustrated in FIG. 2, the reservoir 27 of fluid under low pressure is arranged above the solenoid valve 22 and is particular to the pressure reduction device 10. The operating mode is identical to that described above.

Although only some preferred embodiments of the invention have been described and illustrated, it is clear that any modification made in the same spirit by an average person skilled in the art would not depart from the scope of the present invention, as defined by the accompanying claim.

In particular, although the system is described with a solenoid valve 22 permanently energized as long as the anti-lock function has not failed, it is possible, for economical reasons, to energize the solenoid valve 22 only if the anti-lock function has not failed and if the brake pedal 28 is depressed.

Moreover, although the above-described system includes an anti-lock device, the pressure reduction means according to the invention can likewise be employed in the absence of such a device. In fact, quite independently of this device, it can be advantageous if the monitoring device monitors the state of the hydraulic brake circuits and if, in the event of a failure of one of them, the solenoid valve 22 is energized so as to increase the braking on the rear wheels which have not failed.

What we claim is:

1. A pressure reduction means installed in a brake circuit of the rear axle of a motor vehicle, comprising a master cylinder and at least one monitoring device, said means executing the brake-pressure reduction only in specific circumstances and comprising a regulating piston sliding sealingly in a bore and stressed by at least one spring in an opening direction of a regulating valve, wherein said spring being arranged in a sealed chamber filled with an incompressible fluid, a solenoid valve controling the opening and closing of communication between said chamber and a reservoir of said fluid under low pressure.

2. The pressure reduction means according to claim 1 for a motor vehicle having an anti-lock device, wherein said communication is closed during normal operation of the anti-lock function, whereas in the event of incorrect operation of the latter it is opened.

3. The pressure reduction means according to claim 1, wherein said communication is closed in the event of a failure of a brake circuit.

* * * * *